(12) United States Patent
Jiao et al.

(10) Patent No.: US 7,973,797 B2
(45) Date of Patent: Jul. 5, 2011

(54) PROGRAMMABLE BLENDING IN A GRAPHICS PROCESSING UNIT

(75) Inventors: Guofang Jiao, San Diego, CA (US); Chun Yu, San Diego, CA (US); Lingjun Chen, San Diego, CA (US); Yun Du, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 594 days.

(21) Appl. No.: 11/550,958

(22) Filed: Oct. 19, 2006

(65) Prior Publication Data

US 2008/0094410 A1   Apr. 24, 2008

(51) Int. Cl.
- G09G 5/00 (2006.01)
- G09G 5/02 (2006.01)
- G06T 15/50 (2006.01)
- G06T 15/60 (2006.01)

(52) U.S. Cl. .................... 345/582; 345/592; 345/426
(58) Field of Classification Search .................. 345/582, 345/592, 426

See application file for complete search history.

(56) References Cited

U.S. PATENT DOCUMENTS

| | | | | |
|---|---|---|---|---|
| 5,440,682 A * | 8/1995 | Deering | | 345/503 |
| 5,977,977 A * | 11/1999 | Kajiya et al. | | 345/418 |
| 6,100,899 A * | 8/2000 | Ameline et al. | | 345/605 |
| 6,259,462 B1 * | 7/2001 | Gruber et al. | | 345/561 |
| 6,289,364 B1 * | 9/2001 | Borg et al. | | 715/209 |
| 6,339,432 B1 * | 1/2002 | Grossman | | 345/639 |
| 6,466,210 B1 * | 10/2002 | Carlsen et al. | | 345/629 |
| 6,496,187 B1 * | 12/2002 | Deering et al. | | 345/419 |
| 7,034,828 B1 * | 4/2006 | Drebin et al. | | 345/426 |
| 7,057,653 B1 * | 6/2006 | Kubo | | 348/273 |
| 7,483,042 B1 * | 1/2009 | Glen | | 345/629 |
| 2003/0053086 A1 * | 3/2003 | Chen et al. | | 358/1.9 |
| 2005/0276502 A1 * | 12/2005 | Brown Elliott et al. | | 382/254 |
| 2006/0092162 A1 * | 5/2006 | Deering et al. | | 345/506 |
| 2006/0192788 A1 * | 8/2006 | Stollnitz | | 345/592 |
| 2006/0239579 A1 * | 10/2006 | Ritter | | 382/274 |

FOREIGN PATENT DOCUMENTS

| | | |
|---|---|---|
| EP | 1050852 | 11/2000 |
| EP | 1696387 | 8/2006 |
| KR | 20010113669 | 12/2001 |
| KR | 20060094850 | 8/2006 |

OTHER PUBLICATIONS

Daniel Rice; OpenVG Specification Version 1.0; Jul. 28, 2005; pp. 131-133.*

(Continued)

*Primary Examiner* — Xiao M Wu
*Assistant Examiner* — David T Welch
(74) *Attorney, Agent, or Firm* — George C. Pappas; James R. Gambale, Jr.

(57) ABSTRACT

Techniques for implementing blending equations for various blending modes with a base set of operations are described. Each blending equation may be decomposed into a sequence of operations. In one design, a device includes a processing unit that implements a set of operations for multiple blending modes and a storage unit that stores operands and results. The processing unit receives a sequence of instructions for a sequence of operations for a blending mode selected from the plurality of blending modes and executes each instruction in the sequence to perform blending in accordance with the selected blending mode. The processing unit may include (a) an ALU that performs at least one operation in the base set, e.g., a dot product, (b) a pre-formatting unit that performs gamma correction and alpha scaling of inbound color values, and (c) a post-formatting unit that performs gamma compression and alpha scaling of outbound color values.

37 Claims, 5 Drawing Sheets

OTHER PUBLICATIONS

Jiang et al., "An Automatic Detergent Blending System Based On Virtual X Device Driver," Industrial Technology, 2002, IEEE ICIT '02, 2002 IEEE International Conference, Dec. 11-14, 2002, pp. 810-814, vol. 2, IEEE, Piscataway, NJ, USA, XP010637156.

International Search Report, PCT/US07/081952, International Search Authority, European PAtent Office, May 9, 2008.

Written Opinion, PCT/US07/081952, International Search Authority, European Patent Office, May 9, 2008.

* cited by examiner

PROGRAMMABLE BLENDING IN A GRAPHICS PROCESSING UNIT

BACKGROUND

I. Field

The present disclosure relates generally to electronics, and more specifically to techniques for performing blending in a graphics processing unit.

II. Background

Graphics processing units (GPUs) are specialized hardware units used to render 2-dimensional (2-D) and/or 3-dimensional (3-D) images for various applications such as video games, graphics, computer-aided design (CAD), simulation and visualization tools, imaging, etc. A GPU may perform various graphics operations to render an image. One such graphics operation is blending, which is also commonly referred to as alpha blending, alpha compositing, etc. Blending may be used to obtain transparency effects in an image. Blending may also be used to combine intermediate images that may have been rendered separately into a final image. Blending involves combining a source color value with a destination color value in accordance with a set of equations. The equations are functions of the color values and alpha values. Different results may be obtained with different equations and/or different alpha values.

A GPU may support various blending modes that can achieve different visual effects. Each blending mode uses a different set of equations for combining the color and alpha values to achieve a particular visual effect. A GPU may use dedicated hardware to directly implement the sets of equations for all supported blending modes. However, such a direct implementation of the blending equations may be complex and cost prohibitive.

There is therefore a need in the art for techniques to efficiently implement blending equations for various blending modes supported by a GPU.

SUMMARY

Techniques for efficiently performing blending are described herein. In an aspect, blending equations for supported blending modes are efficiently implemented with a base set of operations. Each blending equation may be decomposed into a sequence of operations, with each operation taken from the base set. Different blending equations may be implemented with different sequences of operations. The base set of operations simplifies hardware implementation and provides flexibility to support various blending equations/modes as well as other graphics functions and features.

In one design, a device (e.g., a GPU) includes a processing unit that implements a set of operations for a plurality of blending modes and a storage unit that stores operands and results for the processing unit. The processing unit receives a sequence of instructions for a sequence of operations for a blending mode selected from the plurality of blending modes and executes each instruction in the sequence to perform blending in accordance with the selected blending mode. The processing unit may include, e.g., (a) an execution unit that executes the sequence of instructions, (b) a pre-formatting unit that performs gamma correction and alpha scaling of inbound color values, (c) a post-formatting unit that performs gamma compression and alpha scaling of outbound color values, and (d) a computation unit that performs computation for the execution unit, pre-formatting unit, and post-formatting unit. The computation unit may include, e.g., an arithmetic logic unit (ALU), a reciprocal unit, a gamma look-up table, and a degamma look-up table, which may be shared by the execution unit, pre-formatting unit, and post-formatting unit. The storage unit may include registers to store operands and results for instructions, e.g., a source register, a destination register, and possibly additional registers.

Various aspects and features of the disclosure are described in further detail below.

DETAILED DESCRIPTION

A graphics processing unit (GPU) may support various blending modes to achieve different visual effects. For example, a GPU may support the blending modes defined in a document "OpenVG Specification, Version 1.0," Jul. 28, 2005, which is publicly available and hereinafter referred to as OpenVG. OpenVG is a new standard for 2-D vector graphics and is suitable for handheld and mobile devices, e.g., cellular phones.

A blending mode is associated with the following:
1. an alpha blending equation/function denoted as $\alpha(\alpha_{src}, \alpha_{dst})$, and
2. a color blending equation/function denoted as $c(c_{src}, c_{dst}, \alpha_{src}, \alpha_{dst})$, where $\alpha_{src}$ is a source alpha value, $\alpha_{dst}$ is a destination alpha value, $c_{src}$ is a source color value, and $c_{dst}$ is a destination color value. A color value may be for red (R), green (G), blue (B), etc. The alpha and color blending equations for various blending modes are given below.

Blending combines a source color and alpha tuple denoted as $(R_{src}, G_{src}, B_{src}, \alpha_{src})$ with a destination color and alpha tuple denoted as $(R_{dst}, G_{dst}, B_{dst}, \alpha_{dst})$ and provides a blended tuple composed of $c(R_{src}, R_{dst}, \alpha_{src}, \alpha_{dst})$, $c(G_{src}, G_{dst}, \alpha_{src}, \alpha_{dst})$, $c(B_{src}, B_{dst}, \alpha_{src}, \alpha_{dst})$, and $\alpha(\alpha_{src}, \alpha_{dst})$. The combining is performed in accordance with the alpha and color blending equations. In particular, the source and destination color values for each color component is combined in accordance with the color blending equation, and the source and destination alpha values are combined in accordance with the alpha blending equation. The blended tuple typically replaces the destination tuple.

OpenVG supports five Porter-Duff blending modes that use the following alpha and color blending equations:

$$\alpha(\alpha_{src}, \alpha_{dst}) = \alpha_{src} * F_{src} + \alpha_{dst} * F_{dst}, \text{ and} \qquad \text{Eq (1)}$$

$$c(c_{src}, c_{dst}, \alpha_{src}, \alpha_{dst}) = \frac{\alpha_{src} * c_{src} * F_{src} + \alpha_{dst} * c_{dst} * F_{dst}}{\alpha(\alpha_{src}, \alpha_{dst})}, \qquad \text{Eq (2)}$$

where $F_{src}$ and $F_{dst}$ are source and destination blending factors, respectively, and are different for different blending modes.

A color value c may be multiplied with an alpha value α to obtain a pre-multiplied color value c', as follows:

$$c' = \alpha * c. \qquad \text{Eq (3)}$$

The color blending equation for pre-multiplied color values may be given as:

$$c'(c'_{src}, c'_{dst}, \alpha_{src}, \alpha_{dst}) = c'_{src} * F_{src} + c'_{dst} * F_{dst} \quad \text{Eq (4)}$$

Equation (4) is equivalent to equation (2). Equation (4) may be used for pre-multiplied color values $c'_{src}$ and $c'_{dst}$ whereas equation (2) may be used for non pre-multiplied color values $c_{src}$ and $c_{dst}$.

Table 1 gives the $F_{src}$ and $F_{dst}$ blending factors for the five Porter-Duff blending modes in OpenVG.

TABLE 1

| Blending Mode | $F_{src}$ | $F_{dst}$ |
|---|---|---|
| Src | 1 | 0 |
| Src over Dst | 1 | $1 - \alpha_{src}$ |
| Dst over Src | $1 - \alpha_{dst}$ | 1 |
| Src in Dst | $\alpha_{dst}$ | 0 |
| Dst in Src | 0 | $\alpha_{src}$ |

Figure 1A:
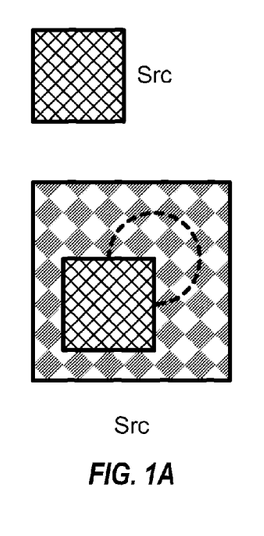
FIGS. 1A-1E illustrate blending for five Porter-Duff blending modes.
Figure 1B:
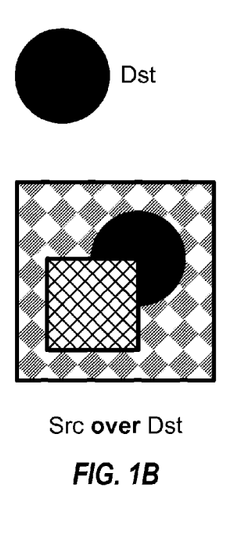
Figure 1C:
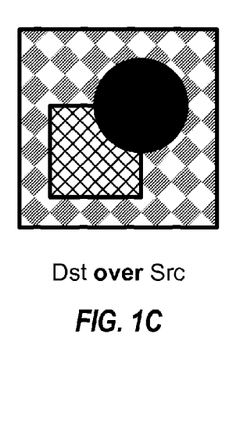
Figure 1D:
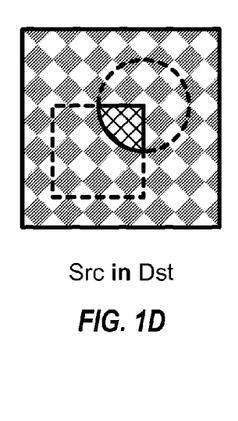
Figure 1E:
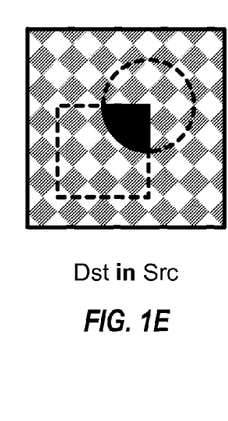

FIGS. 1A through 1E illustrate blending for the five Porter-Duff blending modes in OpenVG. In these examples, the source (Src) is represented by a square with cross hashing, and the destination (Dst) is represented by a circle with solid fill. FIG. 1A shows the "Src" blending mode. In this blending mode, the source (square) replaces the background, and the destination (circle) is completely transparent. FIG. 1B shows the "Src over Dst" blending mode. In this blending mode, the source replaces the destination and background, and the destination replaces the background. FIG. 1C shows the "Dst over Src" blending mode. In this blending mode, the destination replaces the source and background, and the source replaces the background. FIG. 1D shows the "Src in Dst" blending mode. In this blending mode, the portion of the source that is within the destination replaces the background. FIG. 1E shows the "Dst in Src" blending mode. In this blending mode, the portion of the destination that is within the source replaces the background.

OpenVG supports four additional blending modes. Table 2 lists the four additional blending modes and gives the color blending equation for each mode. Each additional blending mode combines color values and provides a blended pre-multiplied color value denoted as $c'(c_{src}, c_{dst}, \alpha_{src}, \alpha_{dst})$

TABLE 2

| Blending Mode | Color Blending Equation $c'(c_{src}, c_{dst}, \alpha_{src}, \alpha_{dst})$ |
|---|---|
| VG_BLEND_MULTIPLY | $\alpha_{src} * c_{src} * (1 - \alpha_{dst}) + \alpha_{dst} * c_{dst} * (1 - \alpha_{src}) + \alpha_{src} * c_{src} * \alpha_{dst} * c_{dst}$ |
| VG_BLEND_SCREEN | $\alpha_{src} * c_{src} + \alpha_{dst} * c_{dst} - \alpha_{src} * c_{src} * \alpha_{dst} * c_{dst}$ |
| VG_BLEND_DARK | $\min\{(\alpha_{src} * c_{src} + \alpha_{dst} * c_{dst} * (1 - \alpha_{src})), (\alpha_{dst} * c_{dst} + \alpha_{src} * c_{src} * (1 - \alpha_{dst}))\}$ |
| VG_BLEND_LIGHTEN | $\max\{(\alpha_{src} * c_{src} + \alpha_{dst} * c_{dst} * (1 - \alpha_{src})), (\alpha_{dst} * c_{dst} + \alpha_{src} * c_{src} * (1 - \alpha_{dst}))\}$ |

OpenVG further supports an additive blending mode that may be used when the source and destination do not overlap. The alpha and color blending equations for the additive blending mode are given as:

$$\alpha(\alpha_{src}, \alpha_{dst}) = \min\{(\alpha_{src} + \alpha_{dst}), 1\}, \text{ and} \quad \text{Eq (5)}$$

$$c(c_{src}, c_{dst}, \alpha_{src}, \alpha_{dst}) = \frac{\alpha_{src} * c_{src} + \alpha_{dst} * c_{dst}}{\min\{(\alpha_{src} + \alpha_{dst}), 1\}}. \quad \text{Eq (6)}$$

Other blending modes may also be supported for 2-D graphics. In general, a GPU may support any set of blending modes for any set of blending equations for 2-D graphics.

A GPU may also support various blending modes for 3-D graphics, e.g., the blending modes defined in Open Graphics Library (OpenGL), Direct3D, etc. OpenGL is described in a document entitled "The OpenGL® Graphics System: A Specification," Version 2.0, dated Oct. 22, 2004, which is publicly available. OpenGL supports blending modes such as FUNC ADD ($\alpha_{src} * c_{src} + \alpha_{dst} * c_{dst}$), FUNC SUBTRACT ($\alpha_{src} * c_{src} - \alpha_{dst} * c_{dst}$), FUNC REVERSE SUBTRACT ($\alpha_{dst} * c_{dst} - \alpha_{src} * c_{src}$), and MIN ($\min\{c_{src}, c_{dst}\}$), MAX ($\max\{c_{src}, c_{dst}\}$). Various blending factors may be used for the blending modes and are given in the OpenGL document. Direct3D similarly supports various blending modes and blending equations.

As described above, e.g., in equations (1) through (6) and Tables 1 and 2, there may be many equations for many blending modes. Direct implementation of the alpha and color blending equations for all blending modes in dedicated hardware may be complex and cost prohibitive.

In an aspect, the blending equations for supported blending modes (e.g., the blending modes in OpenVG and/or other blending modes) are efficiently implemented with a base set of operations. Each blending equation may be decomposed into a sequence of operations, with each operation taken from the base set. Different blending equations may be implemented with different sequences of operations. The base set of operations simplifies hardware implementation and provides flexibility to support various blending equations as well as other graphics functions and features.

Figure 2:
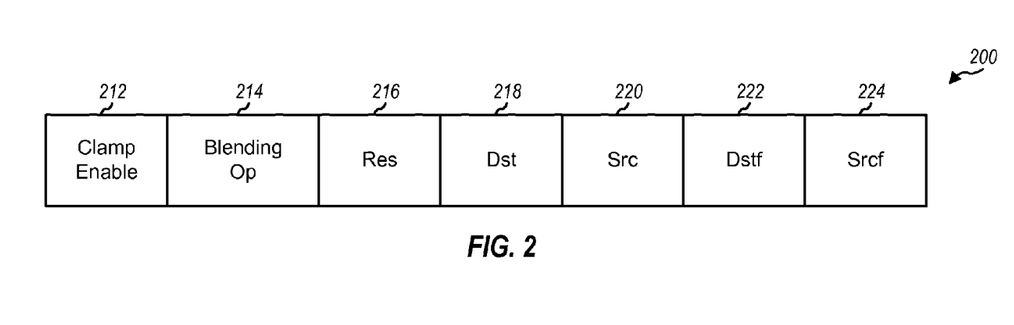
FIG. 2 shows a design of a blending instruction.

FIG. 2 shows a design of a blending instruction 200 for an operation used for blending. In this design, blending instruction 200 includes a clamp enable field 212, a blending operation (Op) field 214, a result (Res) field 216, a destination (Dst) field 218, a source (Src) field 220, a destination blending factor (Dstf) field 222, and a source blending factor (Srcf) field 224. Blending Op field 214 indicates which operation in the base set to perform. Src field 220 indicates where a source value is stored. Dst field 218 indicates where a destination value is stored. Srcf field 224 indicates a source blending factor for the operation. Dstf field 222 indicates a destination blending factor for the operation. Res field 216 indicates where to store the result(s) of the operation. Clamp enable field 212 indicates whether to constrain the result(s) to a predetermined range of values, e.g., between 0 and 1. Other instruction formats with different fields may also be used.

Table 3 shows a design of the base set of operations and the Op code assigned to each operation. For each blending instruction, blending Op field 214 stores the Op code of the operation to be performed for that blending instruction. For simplicity, operations with Op codes 0 through 7 are referred to as operations 0 through 7, respectively.

TABLE 3

| Op Code | Operation |
|---|---|
| 0 | Res = Src * Srcf + Dst * Dstf |
| 1 | Res = Src * Srcf − Dst * Dstf |
| 2 | Res = Min {Src, Dst} |
| 3 | Res = Max {Src, Dst} |
| 4 | Src = Src * Srcf, Dst = Dst * Dstf |
| 5 | Res = RCP {Src} |
| 6 | Res = DegammaLUT {Src} |
| 7 | Res = GammaLUT {Src} |

For operations 0 and 1, the source and destination values are scaled by the source and destination blending factors, respectively, and the scaled values are combined. Operation 0 performs a dot product of two operands with two blending factors. Operation 1 is a variant of the dot product. Operations 0 and 1 may be used for all of the blending modes described above. Operation 2 provides the smaller of the source and destination values whereas operation 3 provides the larger of the two values. Operations 2 and 3 may be used for the VG_BLEND_DARK, VG_BLEND_LIGHTEN, and additive blending modes. Operation 4 scales the source and destination values with the source and destination blending factors, respectively, and stores the two scaled values. Operation 4 may be used for conversion between pre-multiplied and non pre-multiplied color values.

Operation 5 performs a reciprocal (RCP) operation on a source value and provides a result value. The reciprocal operation is used to convert a divide operation into a multiply operation, which is typically much less complex. For example, a color value may be obtained from a pre-multiplied color value as $c=c'/\alpha$. The division by alpha may be avoided by first obtaining the reciprocal of alpha (or $1/\alpha$) and then multiplying c' with $1/\alpha$ as follows: $c=c'*(1/\alpha)$. The reciprocal operation may also be used for equations (2) and (6), both of which include a division by a result alpha value.

Operations 6 and 7 are used for gamma expansion and gamma compression, respectively. Human eyes are more sensitive to low luminance/intensity than high luminance. A color value may be compressed via a process commonly referred to as gamma compression or gamma encoding. Gamma compression maps a color value such that finer resolution is achieved for low luminance and coarser resolution is achieved for high luminance. Gamma compression may be performed as $c_{comp}=c_{lin}^{\gamma}$, where $c_{lin}$ is a linear color value, $c_{comp}$ is a compressed or non-linear color value, and $\gamma$ is a gamma value that determines the amount of compression. In general, gamma compression may be performed based on any function or mapping. Gamma expansion is a complementary process that expands a compressed color value to obtain a linear color value. Gamma expansion is based on a function that is the inverse of the function used for gamma compression. Color components R, G and B are typically stored in memory as compressed color values.

In general, blending may be performed on linear or compressed color values. Improved results might be obtained by performing blending on linear color values. Hence, compressed color values may be retrieved from memory and expanded prior to blending. The blended color values may then be compressed prior to storing back to memory. Gamma compression may be achieved with a gamma look-up table (LUT) that stores the gamma compression function. Gamma expansion may be achieved with a degamma LUT that stores the complementary gamma expansion function. For operation 6, the degamma LUT receives a compressed color value and provides a linear color value. For operation 7, the gamma LUT receives a linear color value and provides a compressed color value.

Table 3 shows a specific design for a base set of operations. Other sets of operations may also be used to support blending.

Source color values may be received from a shader core and stored in a source register. Destination color values may be retrieved from a memory and stored in a destination register. The source and destination color values may be combined, and the blended color values may be stored in the destination register.

To flexibly support different operations, multiple source registers may be used to store source color and alpha values as well as intermediate values. Alternatively or additionally, multiple destination registers may be used to store destination color and alpha values as well as intermediate values. In one design, two source registers and two destination registers are used to store source, destination, and intermediate values. For each of operations 0 through 4 in Table 3, the Src and Dst may correspond to any two of the source and destination registers. For each of operations 5 through 7 in Table 3, the Src may correspond to any one of the source and destination registers. For each operation, the result(s) may be stored in the source and/or destination register, or back to memory.

Table 4 shows a design of the Src, Dst, and Res fields for blending instruction 200 in FIG. 2. For each blending instruction, Src field 220 may indicate any one of the four registers listed in the second column of Table 4, Dst field 218 may also indicate any one of the four registers, and Res field 216 may indicate any one of the six output options shown in the last column of Table 4. The source and destination registers (code 4 for Res) are both used for operation 4 in Table 3. Other designs with different registers and/or output options may also be used.

TABLE 4

| Code | Src & Dst | Code | Res |
|---|---|---|---|
| 0 | Source register | 0 | Source register |
| 1 | Second source register | 1 | Second source register |
| 2 | Destination register | 2 | Destination register |
| 3 | Temp destination register | 3 | Temp destination register |
| | | 4 | Both source & destination registers |
| | | 5 | Final output |

The Srcf and Dstf blending factors are used to scale the Src and Dst values, respectively, in operations 0, 1 and 4 in Table 3. The Srcf and Dstf blending factors may be defined to support all blending modes. Additional blending factors may also be defined to support other graphics functions and features (e.g., 3-D graphics).

Table 5 shows a design of the Srcf and Dstf blending factors for blending instruction 200 in FIG. 2. For each blending instruction, Srcf field 224 may indicate any one of the selections shown in Table 5, and Dstf field 222 may also indicate any one of these selections. A driver/compiler that generates blending instructions may select the appropriate blending factor(s) for each blending instruction.

TABLE 5

| Code | Srcf & Dstf |
|---|---|
| 0 | 0 |
| 1 | Src_Alpha |
| 2 | Src_Color |
| 3 | Dst_Alpha |

TABLE 5-continued

| Code | Srcf & Dstf |
|------|-------------|
| 4 | Dst_Color |
| 5 | Const_Alpha |
| 6 | Const_Color |
| 8 | 1 |
| 9 | 1 − Src_Alpha |
| 10 | 1 − Src_Color |
| 11 | 1 − Dst_Alpha |
| 12 | 1 − Dst_Color |
| 13 | 1 − Const_Alpha |
| 14 | 1 − Const_Color |
| 15 | min {As, 1 − As} |
| 16 | Src2_Alpha |
| 17 | Src2_Color |
| 18 | 1 − Src2_Alpha |
| 19 | 1 − Src2_Color |

In Table 5, Src_Alpha and Src_Color are the alpha and color values, respectively, in the source register, Src2_Alpha and Src2_Color are the alpha and color values, respectively, in the second source register, Dst_Alpha and Dst_Color are the alpha and color values, respectively, in the destination register, and Const_Alpha and Const_Color are the alpha and color values, respectively, in a constant register.

The various blending modes may be efficiently implemented with the blending instruction, base set of operations, source and destination registers, and source and destination blending factors described above. For clarity, blending instructions for the blending modes in OpenVG are described in detail below. Each of the five Porter-Duff blending modes shown in equations (1) through (4) and Table 1 may be implemented with two instructions. The first instruction multiplies the source and destination color values with the source and destination alpha values, respectively. Table 6 gives the codes for the various fields of the first instruction.

TABLE 6

Multiply by alpha

| Op Code | Src Code | Dst Code | Srcf Code | Dstf Code | Res Code | Operation |
|---------|----------|----------|-----------|-----------|----------|-----------|
| 4 | 0 | 2 | 1 | 3 | 4 | $C_{src} = \alpha_{src} * C_{src}, C_{dst} = \alpha_{dst} * C_{dst}$ |

The second instruction multiplies the pre-multiplied source and destination color values with $F_{src}$ and $F_{dst}$ blending factors, respectively, and combines the two scaled values, as shown in equation (4). Table 7 gives the codes for the various fields of the second instruction for each of the five Porter-Duff blending modes in OpenVG.

TABLE 7

Porter-Duff Blending Modes

| Op Code | Src Code | Dst Code | Srcf Code | Dstf Code | Res Code | Blending Mode | $F_{src}$ | $F_{dst}$ |
|---------|----------|----------|-----------|-----------|----------|---------------|-----------|-----------|
| 0 | 0 | 2 | 8 | 0 | 5 | Src | 1 | 0 |
| 0 | 0 | 2 | 8 | 9 | 5 | Src over Dst | 1 | $1 - \alpha_{src}$ |
| 0 | 0 | 2 | 11 | 8 | 5 | Dst over Src | $1 - \alpha_{dst}$ | 1 |
| 0 | 0 | 2 | 3 | 0 | 5 | Src in Dst | $\alpha_{dst}$ | 0 |
| 0 | 0 | 2 | 0 | 1 | 5 | Dst in Src | 0 | $\alpha_{src}$ |

The VG_BLEND_MULTIPLY blending mode may be implemented with three instructions. The first instruction obtains the pre-multiplied source and destination color values. The second instruction computes $\alpha_{src}*c_{src}*(1-\alpha_{dst})+\alpha_{dst}*c_{dst}*(1-\alpha_{src})$ and stores the intermediate result in the temp destination register. The third instruction sums the intermediate result with $\alpha_{src}*c_{src}*\alpha_{dst}*c_{dst}$. Table 8 gives the codes for the three instructions for the VG_BLEND_MULTIPLY blending mode.

TABLE 8

VG_BLEND_MULTIPLY Blending Mode

| Op Code | Src Code | Dst Code | Srcf Code | Dstf Code | Res Code | Operation |
|---------|----------|----------|-----------|-----------|----------|-----------|
| 4 | 0 | 2 | 1 | 3 | 4 | $C_{src} = \alpha_{src} * C_{src}, C_{dst} = \alpha_{dst} * C_{dst}$ |
| 0 | 0 | 2 | 11 | 9 | 3 | $C_{tmp} = C_{src} * (1 - \alpha_{dst}) + C_{dst} * (1 - \alpha_{src})$ |
| 0 | 3 | 2 | 8 | 2 | 5 | $C_{res} = C_{tmp} + C_{src} * C_{dst}$ |

The VG_BLEND_SCREEN blending mode may be implemented with two instructions. The first instruction obtains the pre-multiplied source and destination color values. The second instruction computes $\alpha_{src}*c_{src}+\alpha_{dst}*c_{dst}-\alpha_{src}*c_{src}*\alpha_{dst}*c_{dst}$. Table 9 gives the codes for the two instructions for the VG_BLEND_SCREEN blending mode.

TABLE 9

VG_BLEND_SCREEN Blending Mode

| Op Code | Src Code | Dst Code | Srcf Code | Dstf Code | Res Code | Operation |
|---------|----------|----------|-----------|-----------|----------|-----------|
| 4 | 0 | 2 | 1 | 3 | 4 | $C_{src} = \alpha_{src} * C_{src}, C_{dst} = \alpha_{dst} * C_{dst}$ |
| 0 | 0 | 2 | 12 | 8 | 5 | $C_{res} = C_{src} * (1 - C_{dst}) + C_{dst}$ |

The VG_BLEND_DARK and VG_BLEND_LIGHTEN blending modes may each be implemented with four instructions. The first instruction obtains the pre-multiplied source and destination color values. The second instruction computes the left part of the min or max expression, which is $(\alpha_{src}*c_{src}+\alpha_{dst}*c_{dst}*(1-\alpha_{src}))$. The third instruction computes the right part of the min or max expression, which is $(\alpha_{dst}*c_{dst}+\alpha_{src}*c_{src}*(1-\alpha_{dst}))$. The fourth instruction performs the compare for the min or max expression. Table 10 gives the codes for the four instructions for the VG_BLEND_DARK and VG_BLEND_LIGHTEN blending modes.

TABLE 10

VG_BLEND_DARK & VG_BLEND_LIGHTEN Blending Modes

| Op Code | Src Code | Dst Code | Srcf Code | Dstf Code | Res Code | Operation |
|---------|----------|----------|-----------|-----------|----------|-----------|
| 4 | 0 | 2 | 1 | 3 | 4 | $C_{src} = \alpha_{src} * C_{src}, C_{dst} = \alpha_{dst} * C_{dst}$ |
| 0 | 0 | 2 | 8 | 9 | 3 | $C_{tmp} = C_{src} + C_{dst} * (1 - \alpha_{src})$ |
| 0 | 0 | 2 | 11 | 8 | 2 | $C_{dst} = C_{dst} + C_{src} * (1 - \alpha_{dst})$ |
| 2/3 | 3 | 2 | — | — | 5 | $C_{res} = \min/\max \{C_{tmp}, C_{dst}\}$ |

The additive blending mode in equations (5) and (6) may be implemented with four instructions. The first instruction computes the numerator of equation (6), which is $\alpha_{src}*c_{src}+\alpha_{dst}*c_{dst}$. The second instruction computes the result alpha value in equation (5). The min operation is achieved by setting clamp enable field 212 in FIG. 2, which limits the result of $(\alpha_{src}+\alpha_{dst})$ to 1. The third instruction computes the reciprocal of the result alpha value. The fourth instruction multiplies the intermediate result from the first instruction with the reciprocal value from the third instruction. The instruction format shown in FIG. 2 may be used for both alpha and color operations. Multiple instructions (e.g., one for alpha and one for color) may be executed in parallel in the same clock cycle. The instructions for alpha and color may have different op codes and operands. Table 11 gives the codes for the four instructions for the additive blending mode. The second instruction is for alpha only and may be executed in parallel with the first instruction in the same clock cycle.

TABLE 11

Additive Blending Mode

| Op Code | Src Code | Dst Code | Srcf Code | Dstf Code | Res Code | Operation |
|---|---|---|---|---|---|---|
| 0 | 0 | 2 | 1 | 3 | 0 | $C_{src} = \alpha_{src} * C_{src} + \alpha_{dst} * C_{dst}$ |
| 0 | 0 | 2 | 8 | 8 | 3 | $\alpha_{res} = \min\{(\alpha_{src} + \alpha_{dst}), 1\}$ |
| 5 | 3 | — | — | — | 3 | $\alpha_{tmp} = \text{RCP}(\alpha_{res})$ |
| 0 | 0 | 2 | 3 | 0 | 5 | $C_{res} = \alpha_{tmp} * C_{src}$ |

As illustrated above, all of the blending modes in OpenVG may be supported using a subset of the features shown in Tables 3 through 5. A GPU may be designed with the capability to support just the blending modes in OpenVG. A GPU may also be designed with additional features, e.g., as described above for Tables 3 through 5. These additional features may be used to support all blending modes of interest. For example, the FUNC REVERSE SUBTRACT blending mode for OpenGL may be emulated/implemented with operation 1 in Table 3 and selecting Src code of 2 for the destination register and Dst code of 0 for the source register. These additional features may also be used to support other graphics functions such as, e.g., stencil interpolation.

Stencil interpolation uses the following set of equations:

$$\alpha_{tmp} = \alpha(\alpha_{image} * \alpha_{paint}, \alpha_{dst}), \quad \text{Eq (7)}$$

$$R_{dst} \leftarrow c(R_{paint}, R_{dst}, R_{image} * \alpha_{image} * \alpha_{paint}, \alpha_{dst})/\alpha_{tmp}, \quad \text{Eq (8)}$$

$$G_{dst} \leftarrow c(G_{paint}, G_{dst}, G_{image} * \alpha_{image} * \alpha_{paint}, \alpha_{dst})/\alpha_{tmp}, \quad \text{Eq (9)}$$

$$B_{dst} \leftarrow c(B_{paint}, B_{dst}, B_{image} * \alpha_{image} * \alpha_{paint}, \alpha_{dst})/\alpha_{tmp},$$
and $\quad \text{Eq (10)}$ $$\alpha_{dst} \leftarrow \alpha_{tmp}, \quad \text{Eq (11)}$$

where $\alpha_{image}$ is a first source alpha value, $\alpha_{paint}$ is a second source alpha value, $\alpha_{src} = \alpha_{image} * \alpha_{paint}$ for equation (7), and $\alpha_{src} = \alpha_{image} * \alpha_{paint} * R_{image}$ for equations (8) through (10).

Alpha blending equation (7) and color blending equations (8) through (10) may be dependent on blending mode. For example, if the "Src over Dst" Porter-Duff blending mode is selected, then the stencil interpolation may be expressed as:

$$\alpha_{tmp} = \alpha_{image} * \alpha_{paint} + \alpha_{dst} * (1 - \alpha_{image} * \alpha_{paint}),$$

$$R_{dst} \leftarrow (\alpha_{image} * \alpha_{paint} * R_{image} * R_{paint} + \alpha_{dst} * R_{dst} * (1 - \alpha_{image} * \alpha_{paint} * R_{image}))/\alpha_{tmp},$$

$$G_{dst} \leftarrow (\alpha_{image} * \alpha_{paint} * G_{image} * G_{paint} + \alpha_{dst} * G_{dst} * (1 - \alpha_{image} * \alpha_{paint} * G_{image}))/\alpha_{tmp},$$

$$B_{dst} \leftarrow (\alpha_{image} * \alpha_{paint} * B_{image} * B_{paint} + \alpha_{dst} * B_{dst} * (1 - \alpha_{image} * \alpha_{paint} * B_{image}))/\alpha_{tmp},$$

$$\alpha_{dst} \leftarrow \alpha_{tmp}.$$

Various blending modes as well as other graphics functions may be supported as follows:

```
10 Call RCP to compute 1/alpha        //Dst pre-format
20 Call MUL to divide alpha out of Dst
30 Call DeGammaLUT to convert compressed color to linear color
40 Op0: Src=alpha*Src, Dst=alpha*Dst   //do blending
41 Op1: Instruction for mode-dependent blending equation
   .                .
   .                .
   .                .
4n Opn: Instruction for mode-dependent blending equation
50 Call RCP to compute 1/alpha        //Dst post-format
60 Call MUL to divide alpha out of Dst
70 Call GammaLUT to convert linear color to compressed color
80 Call MUL to multiply alpha with Dst and store Dst
```

Instructions 10 to 80 assume that color components are stored as pre-multiplied compressed color values. Instructions 10, 20 and 30 are for pre-formatting of the destination color value. Instructions 10 and 20 divide out alpha from the destination color value. Instruction 30 converts compressed color to linear color. Instructions 40 to 4n are for operations that are dependent on the selected blending mode. Instructions 50 to 80 are for post-formatting of the result color value. Instructions 50 and 60 divide out the result alpha to obtain a non pre-multiplied color value. Instruction 70 converts linear color to compressed color. Instruction 80 multiplies the compressed color value with alpha and stores the final result back to memory. Instructions 10, 20 and 80 may be omitted if the color values are stored in non pre-multiplied format. Instructions 30 and 70 may be omitted if color components are stored as linear color values instead of compressed color values.

An example design has been described above in Tables 3 through 5. In general, a blending processing unit may support any set of operations, any set of source and destination registers, and any set of blending factors. The supported set of operations may be used to implement any blending modes and possibly other graphics functions and features. For clarity, the design has been specifically described for the blending modes in OpenVG. The design may also be used for other blending modes.

The blending techniques described herein may be used for various types of processors such as GPUs, graphics processors, digital signal processors (DSPs), reduced instruction set computers (RISCs), advanced RISC machines (ARMs), controllers, microprocessors, etc. Exemplary use of the techniques for a GPU is described below.

Figure 3:
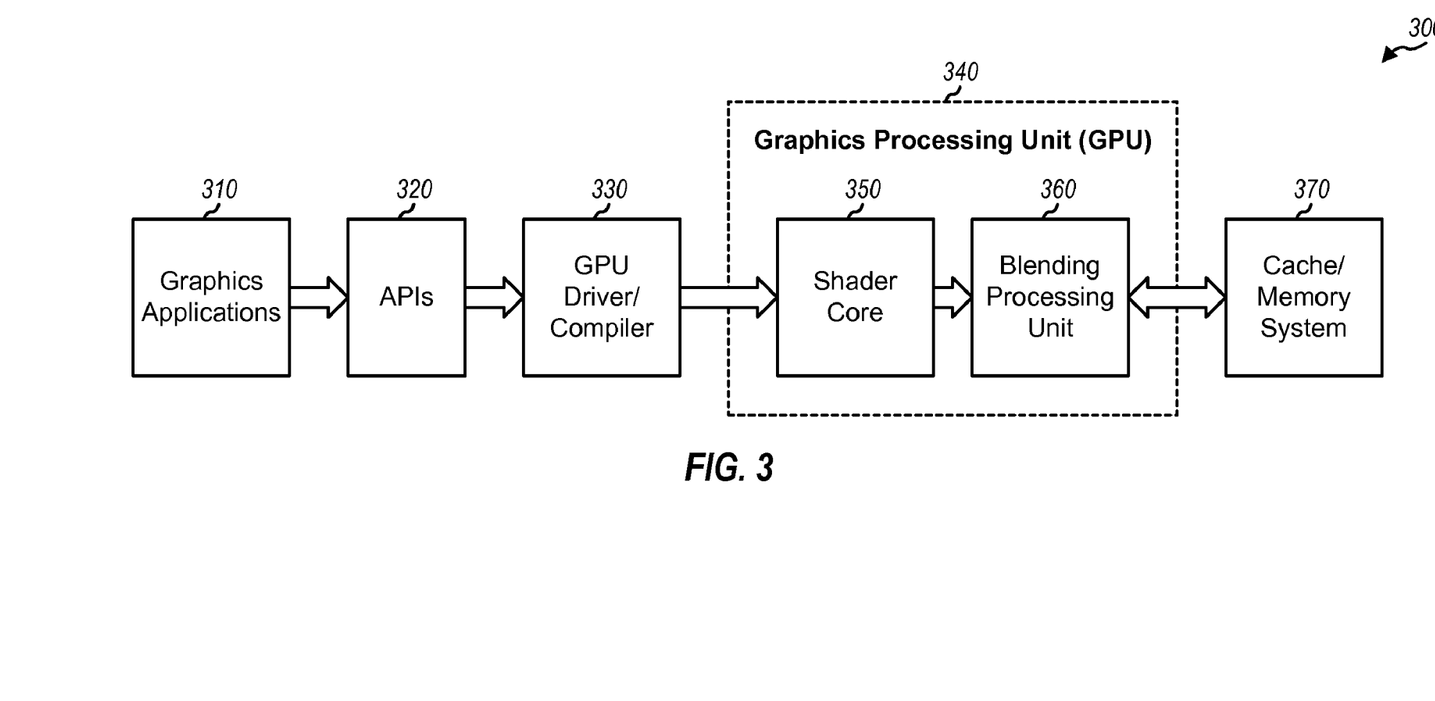
FIG. 3 shows a block diagram of a graphics system.

FIG. 3 shows a block diagram of a design of a graphics system 300, which may be a stand-alone system or part of a larger system such as a computing system, a wireless communication device, etc. Graphics applications 310 may run concurrently and may be for video games, graphics, video-conference, etc. Graphics applications 310 generate high-level commands to perform graphics operations on graphics data. The high-level commands may be relatively complex. The graphics data may include geometry information (e.g., information for vertices of primitives in an image), information describing what the image looks like, etc. Application programming interfaces (APIs) 320 provide an interface between graphics applications 310 and a GPU driver/compiler 330, which may be software and/or firmware executing on a processor.

GPU driver/compiler 330 converts the high-level commands to low-level instructions, which may be machine dependent and tailored for the underlying processing units.

GPU driver/compiler 330 also indicates where graphics data is located, e.g., which buffers store the data. GPU driver/compiler 330 may split the processing of each application into a series of threads, e.g., automatically and transparent to the application. A thread (or thread of execution) indicates a specific task that may be performed with a set of one or more instructions. For example, a thread may perform blending for some number of pixels. Threads allow an application to have multiple tasks performed simultaneously by different units and further allow different applications to share resources.

A GPU 340 includes a shader core 350 and a blending processing unit 360. The terms "core", "engine", "machine", "processor" and "processing unit" are often used interchangeably. Shader core 350 may perform graphics operations such as shading, texture mapping, etc. Blending processing unit 360 performs blending and may support any number of blending modes. GPU 340 may also include other processing units (e.g., a texture engine) that are not shown in FIG. 3 for simplicity.

A cache/memory system 370 may store instructions and data for GPU 340. System 370 may include one or more caches, which are fast memories that can be accessed more quickly.

Figure 4:
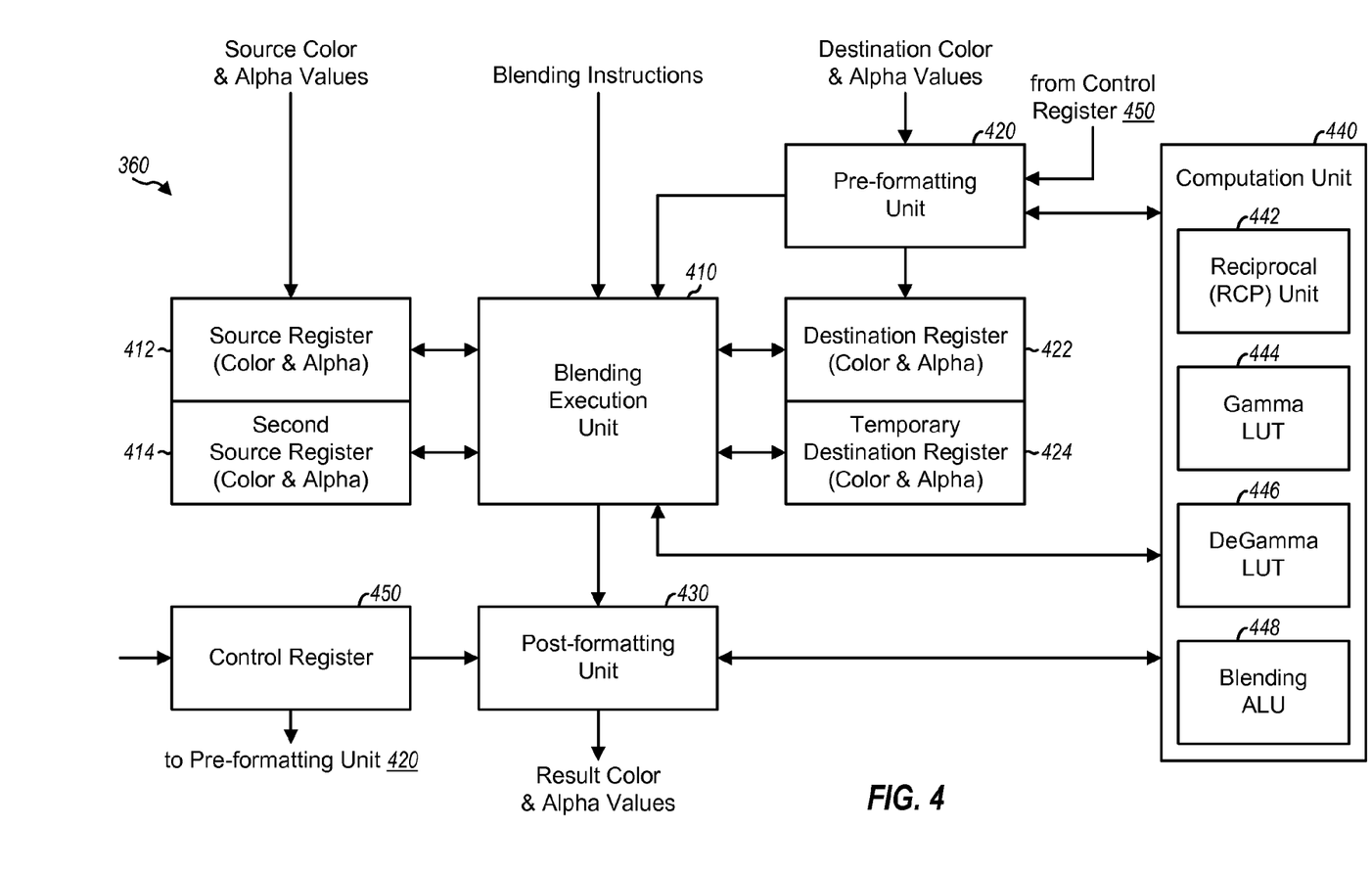
FIG. 4 shows a block diagram of a blending processing unit.

FIG. 4 shows a block diagram of a design of blending processing unit 360 in FIG. 3. A source register 412 receives and stores source color and alpha values (e.g., from shader core 350 in FIG. 3) and/or intermediate results from a blending execution unit 410. A second source register 414 stores additional color and alpha values and/or intermediate results. Blending processing unit 360 may receive one or two sets of source RGB color values for each pixel from shader core 350 and may store each set of source color values in one of source registers 412 and 414. Blending processing unit 360 may perform blending on up to two colors for each pixel.

A pre-formatting unit 420 receives destination color and alpha values (e.g., from memory 370 in FIG. 3) and performs pre-formatting. Unit 420 may divide out alpha for pre-multiplied color values, perform conversion from compressed color to linear color, etc. A destination register 422 stores pre-formatted destination color and alpha values from pre-formatting unit 420 and/or intermediate results from blending execution unit 410. A temporary destination register 424 stores intermediate results.

Blending execution unit 410 receives blending instructions (e.g., from GPU driver/compiler 330 via shader core 350 in FIG. 3) and decodes the received instructions. Unit 410 also reads source and destination values and blending factors according to the decoded instructions and sends these values and factors to a computation unit 440 for processing. Unit 410 receives results from unit 440 and stores these results in the appropriate registers. A post-formatting unit 430 performs post-formatting on the results and may divide out alpha for pre-multiplied color values, perform conversion from linear color to compressed color, multiply by alpha if the result color values are to be stored in pre-multiplied format, etc.

Unit 440 includes a reciprocal (RCP) unit 442, a gamma LUT 444, a degamma LUT 446, and a blending ALU 448. Blending ALU 448 may perform operations 0 through 4 in Table 3. Blender ALU 448 may operate on operands received from unit 410, 420 and 430 and provide the results back to these units. Unit 442 receives input operands and provides the reciprocal of the operands. Gamma LUT 444 receives linear color values and provides compressed color values. Degamma LUT 446 receives compressed color values and provides linear color values. Blending execution unit 410, pre-formatting unit 420, and post-formatting unit 430 may call reciprocal unit 442, gamma LUT 444, degamma LUT 446, and blending ALU 448 as needed, e.g., to perform the operations indicated by the blending instructions, to multiply by alpha or 1/alpha, etc. Blending execution unit 410 may also call gamma LUT 444 and degamma LUT 446 for certain blending modes or special functions. For example, the source values from shader core 350 may be in linear format and a blending mode may operate in compressed format. In this case, blending execution unit 410 may call gamma LUT 444 to convert the source values to compressed format, perform the blending operation, and then call degamma LUT 446 to convert the results back to linear format.

A control register 450 stores control bits that indicate the format of the data being processed. For example, the control bits may indicate whether color values are stored in (a) pre-multiplied or non pre-multiplied format and (b) compressed or linear format. Unit 420 may perform pre-formatting on inbound destination color values in accordance with the control bits. Similarly, unit 430 may perform post-formatting on outbound color values in accordance with the control bits. Control register 450 may be set by GPU driver/compiler 330 or some other unit.

Pre-formatting unit 420, blending execution unit 410, and post-formatting unit 430 may operate in a pipelined manner on a given thread. Unit 410, 420 and 430 may also operate on multiple threads concurrently. For example, in a given clock cycle, unit 420 may perform pre-formatting for one thread, unit 410 may perform processing for another thread, and unit 430 may perform post-formatting for yet another thread. Units 410, 420 and 430 may invoke units 442, 444, 446 and 448 as needed.

The blending processing unit (or blending unit) described herein may be low cost and may support all of the blending modes in OpenVG. The blending unit is flexible and may be able to support other blending modes and blending features. The blending unit may also be used for load balancing with other processing units. For example, some operations may be moved to another processing unit (e.g., shader core 350) to relieve loading of the blending unit, or the blending unit may perform operations for other processing units, to balance the workload between these units. The blending unit may be designed to meet 3-D graphics standards (e.g., OpenGL ES2.0, Direct3D, etc.), OpenVG standard, and/or other standards. The flexible and programmable nature of the blending unit allows it to meet future extensions of these standards by simply re-writing the blending instructions without having to re-design the blending unit.

Figure 5:
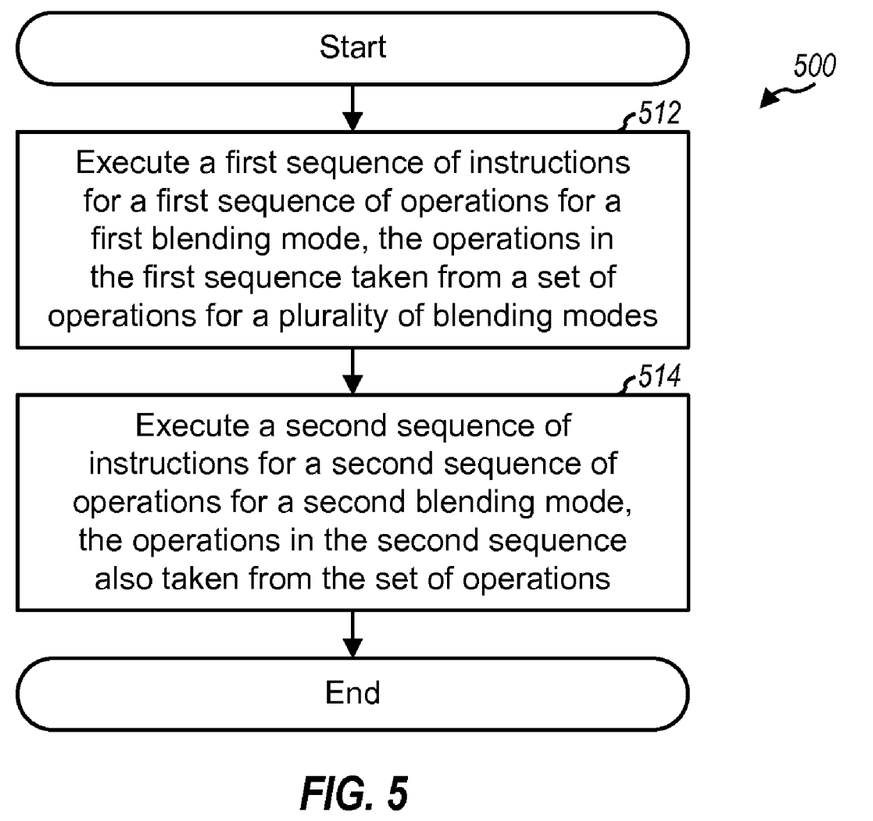
FIG. 5 shows a process for performing blending.

FIG. 5 shows a process 500 for performing blending. A first sequence of instructions is executed for a first sequence of operations for a first blending mode (block 512). A second sequence of instructions is executed for a second sequence of operations for a second blending mode (block 514). The operations in the first and second sequences are from a set of operations for a plurality of blending modes comprising the first and second blending modes. The first and second sequences of instructions may be generated by GPU driver/compiler 330 or some other unit and may be stored in shader core 350, blending processing unit 360, or some other unit. A sequence may include an instruction for a dot product of two operands with two blending factors, an instruction for a reciprocal of an operand, an instruction to convert linear color to compressed color, an instruction to convert compressed color to linear color, etc.

The blending techniques described herein may be used for wireless communication devices, handheld devices, gaming devices, computing devices, networking devices, personal electronics devices, etc. An exemplary use of the techniques for a wireless communication device is described below.

Figure 6:
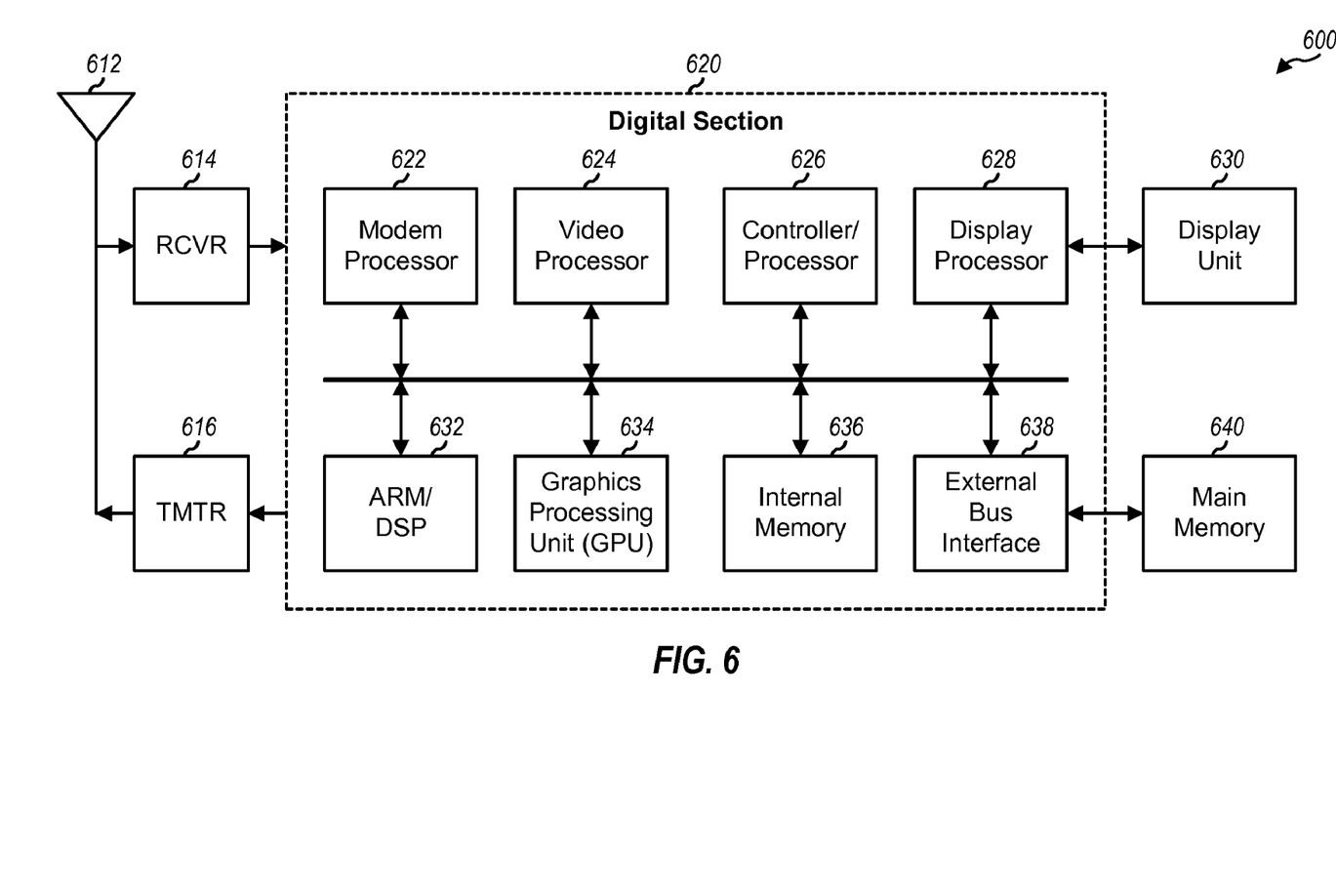
FIG. 6 shows a block diagram of a wireless device.

FIG. 6 shows a block diagram of a design of a wireless communication device 600 in a wireless communication system. Wireless device 600 may be a cellular phone, a terminal, a handset, a personal digital assistant (PDA), or some other device. The wireless communication system may be a Code Division Multiple Access (CDMA) system, a Global System for Mobile Communications (GSM) system, or some other system.

Wireless device 600 is capable of providing bi-directional communication via a receive path and a transmit path. On the receive path, signals transmitted by base stations are received by an antenna 612 and provided to a receiver (RCVR) 614. Receiver 614 conditions and digitizes the received signal and provides samples to a digital section 620 for further processing. On the transmit path, a transmitter (TMTR) 616 receives data to be transmitted from digital section 620, processes and conditions the data, and generates a modulated signal, which is transmitted via antenna 612 to the base stations.

Digital section 620 includes various processing, interface and memory units such as, for example, a modem processor 622, a video processor 624, a controller/processor 626, a display processor 628, an ARM/DSP 632, a GPU 634, an internal memory 636, and an external bus interface (EBI) 638. Modem processor 622 performs processing for data transmission and reception (e.g., encoding, modulation, demodulation, and decoding). Video processor 624 performs processing on video content (e.g., still images, moving videos, and moving texts) for video applications such as camcorder, video playback, and video conferencing. Controller/processor 626 may direct the operation of various processing and interface units within digital section 620. Display processor 628 performs processing to facilitate the display of videos, graphics, and texts on a display unit 630. ARM/DSP 632 may perform various types of processing for wireless device 600. GPU 634 performs graphics processing and may be implemented as shown in FIG. 3. Internal memory 636 stores data and/or instructions for various units within digital section 620. EBI 638 facilitates transfer of data between digital section 620 (e.g., internal memory 636) and a main memory 640.

Digital section 620 may be implemented with one or more DSPs, micro-processors, RISCs, etc. Digital section 620 may also be fabricated on one or more application specific integrated circuits (ASICs) and/or some other type of integrated circuits (ICs).

The blending techniques described herein may be implemented by various means. For example, these techniques may be implemented in hardware, firmware, software, or a combination thereof. For a hardware implementation, the processing unit(s) used to perform blending (e.g., GPU 340 or blending processing unit 360 in FIG. 3) may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing unit(s) may or may not include integrated/embedded memory.

The blending processing unit and GPU described herein may be stand-alone units or may be part of a device. The device may be (i) a stand-alone IC such as a graphics IC, (ii) a set of one or more ICs that may include memory ICs for storing data and/or instructions, (iii) an ASIC, such as a mobile station modem (MSM), with integrated graphics processing functions, (iv) a module that may be embedded within other devices, (v) a cellular phone, wireless device, handset, or mobile unit, (vi) etc.

For a firmware and/or software implementation, the blending techniques may be implemented with modules (e.g., procedures, functions, and so on) that perform the functions described herein. The firmware and/or software codes may be stored in a memory (e.g., memory 636 or 640 in FIG. 6) and executed by a processor (e.g., processor 626). The memory may be implemented within the processor or external to the processor. Such a memory may include RAM memory, flash memory, ROM memory, registers, hard disk, a removable disk, a CD-ROM, a DVD-ROM or any other form of storage medium known in the art.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A device comprising:
 a processing unit configured to:
  receive a selection of a blending mode,
  implement a base set of blending operations, wherein two or more blending operations within the base set of blending operations collectively achieve blending in accordance with at least one of a plurality of possible blending modes, and wherein the selected blending mode comprises one of the plurality of possible blending modes,
  receive a first blending instruction of a sequence of blending instructions, wherein the first blending instruction includes a first operation code assigned to a first blending operation from the base set of blending operations, and wherein the sequence of blending instructions is based on the selected blending mode,
  receive a second blending instruction of the sequence of blending instructions, wherein the second blending instruction includes a second operation code assigned to a second blending operation from the base set of blending operations, and
  execute at least the first and second blending operations based on the first and second operation codes in the sequence of blending instructions to perform blending in accordance with the selected blending mode; and
 a storage unit to store operands and results for the processing unit.

2. The device of claim 1, wherein the processing unit comprises
 a blending execution unit to execute the sequence of blending instructions for the selected blending mode.

3. The device of claim 2, wherein the processing unit further comprises
 a pre-formatting unit to perform gamma correction and alpha scaling of inbound color values, and
 a post-formatting unit to perform gamma compression and alpha scaling of outbound color values.

4. The device of claim 3, wherein the processing unit further comprises
 a computation unit comprising at least one of an arithmetic logic unit (ALU), a reciprocal unit, a gamma look-up table, and a degamma look-up table, the computation unit being shared by the blending execution unit, the pre-formatting unit, and the post-formatting unit.

5. The device of claim 3, wherein the processing unit further comprises a control register to store an indication of format of data being processed, and wherein the pre-formatting unit and the post-formatting unit perform gamma correction, gamma compression, and alpha scaling in accordance with the format indication from the control register.

6. The device of claim 3, wherein the blending execution unit, the pre-formatting unit, and the post-formatting unit operate in parallel on up to three different threads.

7. The device of claim 1, wherein the processing unit comprises
an arithmetic logic unit (ALU) to perform at least one operation in the base set of blending operations.

8. The device of claim 7, wherein the ALU performs a dot product of two operands with two blending factors for at least one of the first and second blending operations.

9. The device of claim 8, wherein the storage unit comprises a plurality of registers, and wherein the two operands for the dot product are from two of the plurality of registers.

10. The device of claim 9, wherein the two blending factors for the dot product are selectable from two of the plurality of registers.

11. The device of claim 8, wherein the two blending factors are each selected from a plurality of blending factors.

12. The device of claim 7, wherein the ALU multiplies two operands with two blending factors and provides two scaled operands for at least one of the first and second blending operations.

13. The device of claim 7, wherein the base set of blending operations comprises a MAX operation and a MIN operation, and wherein the ALU provides a larger operand among two operands for the MAX operation and provides a smaller operand among two operands for the MIN operation.

14. The device of claim 1, wherein the processing unit comprises
a reciprocal unit to receive an operand and provide a reciprocal of the operand.

15. The device of claim 1, wherein the processing unit comprises
a gamma look-up table to receive linear color values and provide compressed color values.

16. The device of claim 1, wherein the processing unit comprises
a degamma look-up table to receive compressed color values and provide linear color values.

17. The device of claim 1, wherein the storage unit comprises
registers to store operands for the sequence of blending instructions, and wherein each blending instruction operates on at least one operand stored in at least one of the registers.

18. The device of claim 1, wherein the storage unit comprises
a source register to store source color and alpha values and intermediate results, and
a destination register to store destination color and alpha values and intermediate results.

19. The device of claim 18, wherein the storage unit further comprises
a second source register to store additional source color and alpha values and intermediate results, and
a temporary destination register to store intermediate results.

20. The device of claim 1, wherein each blending instruction of the sequence of blending instructions comprises a first field indicative of an operation code assigned to a blending operation, a second field indicative of a first operand, a third field indicative of a second operand, a fourth field indicative of a first blending factor, and a fifth field indicative of a second blending factor.

21. The device of claim 1, wherein at least one of the plurality of possible blending modes comprises one of a Porter-Duff blending mode and an additive blending mode in OpenVG.

22. The device of claim 1, wherein the plurality of possible blending modes comprise blending modes for 2-D graphics, 3-D graphics, or 2-D and 3-D graphics.

23. An integrated circuit comprising:
a processing unit configured to:
receive a selection of a blending mode,
implement a base set of blending operations, wherein two or more blending operations with the base set of blending operations collectively achieve blending in accordance with at least one of a plurality of possible blending modes, and wherein the selected blending mode comprises one of the plurality of possible blending modes,
receive a first blending instruction of a sequence of blending instructions, wherein the first blending instruction includes a first operation code assigned a first blending operation from the base set of blending operations, and wherein the sequence of blending instructions is based on the selected blending mode,
receive a second blending instruction of the sequence of blending instructions, wherein the second blending instruction includes a second operation code assigned to a second blending operation from the base set of blending operations, and
execute at least the first and second blending operations based on the first and second operation codes in the sequence of blending instructions to perform blending in accordance with the selected blending mode; and
a storage unit to store operands and results for the processing unit.

24. A wireless device comprising:
a graphics processing unit configured to:
receive a selection of a blending mode,
implement a base set of blending operations, wherein two or more blending operations within the base set of blending operations collectively achieve blending in accordance with at least one of a plurality of possible blending modes, and wherein the selected blending mode comprises one of the plurality of possible blending modes,
receive a first blending instruction of a sequence of blending instructions, wherein the first blending instruction includes a first operation code assigned to a first blending operation from the base set of blending operations, wherein the sequence of blending instructions is based on the selected blending mode,
receive a second blending instruction of the sequence of blending instructions, wherein the second blending instruction includes a second operation code assigned to a second blending operation from the base set of blending operations, and
execute at least the first and second blending operations based on the first and second operation codes in the sequence of blending instructions to perform blending in accordance with the selected blending mode; and
a memory coupled to the graphics processing unit.

25. A method of graphics processing comprising:
receiving, with a processing unit, a selection of a blending mode;

receiving, with the processing unit, a first blending instruction of a sequence of blending instructions, wherein the first blending instruction includes a first operation code assigned to a first blending operation from a base set of blending operations, wherein two or more blending operations within the base set of blending operations collectively achieve blending in accordance with at least one of a plurality of possible blending modes, wherein the selected blending mode comprises one of the plurality of possible blending modes, and wherein the sequence of blending instructions is based on the selected blending mode;

receiving, with the processing unit, a second blending instruction of the sequence of blending instructions, wherein the second blending instruction includes a second operation code assigned to a second blending operation from the base set of blending operations; and executing, with the processing unit, at least the first and second blending operations based on the first and second operation codes in the sequence of blending instructions to perform blending in accordance with the selected blending mode.

26. The method of claim 25, wherein executing at least the first and second blending operations comprises executing an instruction for a dot product of two operands with two blending factors for at least one of the first and second blending operations.

27. The method of claim 25, wherein executing at least the first and second blending operations comprises executing an instruction for a reciprocal of an operand for at least one of the first and second blending operations.

28. The method of claim 25, wherein executing at least the first and second blending operations comprises executing an instruction to convert linear color to compressed color for at least one of the first and second blending operations.

29. The method of claim 25, wherein executing at least the first and second blending operations comprises executing an instruction to convert compressed color to linear color for at least one of the first and second blending operations.

30. A method of graphics processing comprising:
receiving, with a processing unit, a selection of a blending mode;

generating, with the processing unit, a first blending instruction of a sequence of blending instructions, wherein the first blending instruction includes a first operation code assigned to a first blending operation from a base set of blending operations, wherein two or more blending operations within the base set of blending operations collectively achieve blending in accordance with at least one of a plurality of possible blending modes, wherein the selected blending mode comprises one of the plurality of possible blending modes, and wherein the sequence of blending instructions is based on the selected blending mode;

generating, with the processing unit, a second blending instruction of the sequence of blending instructions, wherein the second blending instruction includes a second operation code assigned to a second blending operation from the base set of blending operations; and executing, with the processing unit, at least the first and second blending operations based on the first and second operation codes in the sequence of blending instructions to perform blending in accordance with the selection of the blending mode.

31. A non-transitory computer-readable medium including instructions stored thereon for causing a computer to:
upon receiving a selection of a blending mode, generate a first blending instruction of a sequence of blending instructions, wherein the first blending instruction includes a first operation code assigned to a first blending operation from a base set of blending operations, wherein two or more blending operations within the base set of blending operations collectively achieve blending in accordance with at least one of a plurality of possible blending modes, wherein the selected blending mode comprises one of the plurality of possible blending modes, and wherein the sequence of blending instructions is based on the selected blending mode;

generate a second blending instruction of the sequence of blending instructions, wherein the second blending instruction includes a second operation code assigned to a second blending operation from the base set of blending operations; and execute at least the first and second blending operations based on the first and second operation codes in the sequence of blending instructions to perform blending in accordance with the selection of the blending mode.

32. An apparatus comprising:
means for receiving a selection of a blending mode with a processing unit;

means for receiving a first blending instruction of a sequence of blending instructions, wherein the first blending instruction includes a first operation code assigned to a first blending operation from a base set of blending operations, wherein two or more blending operations within the base set of blending operations collectively achieve blending in accordance with at least one of a plurality of possible blending modes, wherein the selected blending mode comprises one of the plurality of possible blending modes, and wherein the sequence of blending instructions is based on the selected blending mode;

means for receiving a second blending instruction of the sequence of blending instructions, wherein the second blending instruction includes a second operation code assigned to a second blending operation from the base set of blending operations; and means for executing at least the first and second blending operations based on the first and second operation codes in the sequence of blending instructions to perform blending in accordance with the selected blending mode.

33. The apparatus of claim 32, wherein the means for executing at least the first and second blending operations comprises means for executing an instruction for a dot product of two operands with two blending factors for at least one of the first and second blending operations.

34. The apparatus of claim 32, wherein the means for executing at least the first and second blending operations comprises executing an instruction for a reciprocal of an operand for at least one of the first and second blending operations.

35. The apparatus of claim 32, wherein the means for executing at least the first and second blending operations comprises executing an instruction to convert linear color to compressed color for at least one of the first and second blending operations.

36. The apparatus of claim 32, wherein the means for executing at least the first and second blending operations comprises executing an instruction to convert compressed color to linear color for at least one of the first and second blending operations.

37. An apparatus comprising:

means for receiving a selection of a blending mode with a processing unit;

means for generating a first blending instruction of a sequence of blending instructions, wherein the first blending instruction includes a first operation code assigned to a first blending operation from a base set of blending operations, wherein two or more blending operations within the base set of blending operations collectively achieve blending in accordance with at least one of a plurality of possible blending modes, wherein the selected blending mode comprises one of the plurality of possible blending modes, and wherein the sequence of blending instructions is based on the selected blending mode; and means for generating, with the processing unit, a second blending instruction of the sequence of blending instructions, wherein the second blending instruction includes a second operation code assigned to a second blending operation from the base set of blending operations.

* * * * *